Oct. 4, 1927.
J. F. HAWORTH
1,644,375
CABLE OR WIRE CLAMP
Filed Jan. 10, 1927
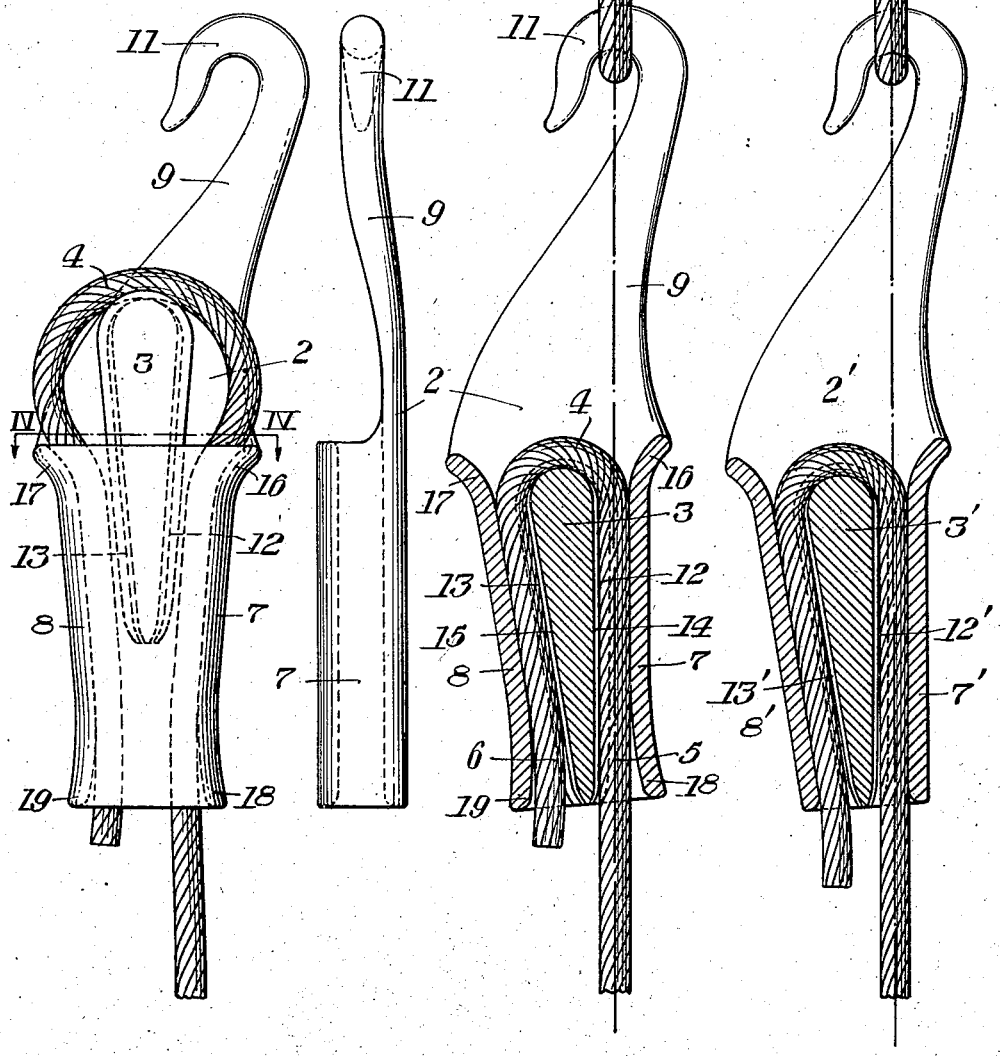
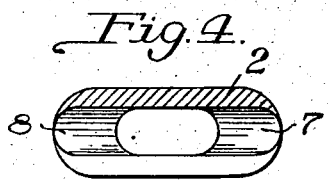
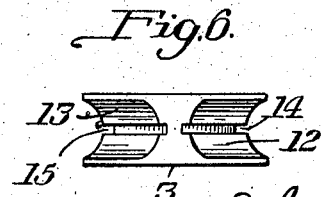
INVENTOR Patented Oct. 4, 1927.

1,644,375

UNITED STATES PATENT OFFICE.

JEHU FREDERIC HAWORTH, OF EDGEWORTH, PENNSYLVANIA.

CABLE OR WIRE CLAMP.

Application filed January 10, 1927. Serial No. 160,125.

The present invention relates to cable or wire clamps and more especially to a clamp in which the cable or wire is frictionally gripped, usually by means of a wedge inserted in a tapered housing so as to clamp the wire between the wedge and the housing in such a manner that tension on the wire will tend to increase the clamping grip of the wedge.

The invention is shown as embodied in the type of connector in which a loop of the wire or cable is passed around a wedge held in the tapered housing so that the tension on one leg of the loop will tend to draw the wedge toward the smaller end of the housing and thus insure an increasing grip on the wire or cable with an increasing tension. An example of this type of connecter is shown in my Patent No. 1,380,800 of June 7, 1921. In the patent is shown a cable clamp comprising a housing having a tapered socket for receiving a loop of the cable or wire and a wedge for frictionally clamping the cable or wire against the socket. In this type of clamp, the wedge is formed so that a portion of each of the edges near the smaller end of the wedge is curved toward its point so that the lower portions of the edges have a greater taper than the taper of the socket. The purpose of making such a provision is to impart to the cable a gradually increasing clamping grip along the tensioned leg of the loop to the portion thereof near the larger end of the housing. The result obtained is a material increase in the working strength of the cable when placed under stress, as clearly set forth in the patent.

I have found that it is desirable to use a wedge having a longitudinal groove in each of its cable-engaging edges, in order that the outer portions of the wedge may be very slightly spread apart so that if there is any slight inequality in the size of the cable or in the walls of the socket such inequality can be relieved and any tendency towards localized points of excessive pressure will be minimized. Such a wedge construction is disclosed in my copending application Serial No. 145,672, filed Nov. 1, 1926. In the manufacture of wedges having longitudinal grooves in their cable-engaging edges such grooves may conveniently be machined in the wedge after it has been otherwise substantially completed. When the edges of the wedge are curved as in my prior patent the problem of accurately machining the grooves therein becomes a rather complicated one for the reason that it is difficult to form a groove of constant depth in a curved surface by the use of a milling machine.

One of the objects of the present invention is to provide a clamp comprising a housing having a tapered socket and a wedge for frictionally clamping the cable or wire against the socket, the edge of the wedge engaging the tensioned leg of the cable loop being straight substantially in the direction of its length and the socket being so formed that when the wedge is in cable-clamping position therein, said straight edge of the wedge and the cable-engaging portion of the socket cooperating therewith diverge toward the smaller end of the socket. I thus provide a construction which serves to exert a gradually increasing clamping grip on the tensioned leg of the cable loop and at the same time simplify the machining of the longitudinal groove in the wedge by forming the edge thereof which engages the tensioned leg of the cable loop straight substantially in the direction of its length.

A further object of the present invention is to provide a clamp of the type above mentioned having the cable-engaging sides of the socket above the cable-clamping portions thereof flared sharply outwardly to permit the loop of cable to be initially drawn into the socket without abrasion.

For simplicity, the invention will be described with particular reference to a cable clamp of the usual type in which the end of the cable embraces a single wedge held in a tapered housing. While a cable of the wire rope type which is made up of a plurality of separate wires is illustrated as being held in the clamp, it will be obvious that a cable composed of a single wire or a cable of material other than metal might be held.

In the drawings:

Figure 1 is a plan view of a cable clamp embodying my invention, showing a cable looped therein before being tightly drawn down into the housing;

Figure 2 is a side elevation of the cable clamp;

Figure 3 is a longitudinal cross-section of the cable clamp shown in Figure 1, showing a cable clamped therein;

Figure 4 is a cross-section taken on the line IV—IV of Figure 1;

Figure 5 is a longitudinal cross-section of a modified form of clamp; and

Figure 6 is an enlarged bottom view of the wedge used in my clamp.

Referring first to Figures 1 to 4, the cable clamp as shown therein comprises a housing indicated generally by reference numeral 2. The housing has a tapered socket in which the wedge 3 is inserted, the cable 4 is passed around the wedge, as shown, in the form of a loop, the leg 5 of which is a continuation of the tensioned part of the cable. The leg 6 is under relatively little tension since it is the part of the loop toward the free end of the cable. The tapering socket is formed between the converging side walls 7 and 8.

As will be readily apparent, a pull on the tensioned part 5 of the cable will tend to draw the wedge 3 toward the smaller end of the tapered socket and will increase the grip on the cable between the wedge and the sides of the socket. The upper part of the housing has an extension 9 on which is provided suitable means for engaging an attaching device such as another cable 10. Such means may conveniently be in the form of a hook 11. The bearing point of the hook is directly in the center line of the tensioned part 5 of the cable, so that the pull exerted is in direct line of the cable, and the cable is not subjected to any weakening kinks or bends where it emerges from the clamp.

The wedge 3 has tapered cable-engaging edges 12 and 13 which are straight substantially in the directions of their respective lengths. These edges are preferably channeled to permit them to partially encircle a cable as shown in Figure 6. In the edges 12 and 13 of the wedge, I provide longitudinally extending grooves 14 and 15 respectively. These grooves permit of a slight spreading movement of the sides of the edges 12 and 13 so that if there is any slight inequality in the size of the cable or in the walls 7 and 8 of the socket or in the channeled edges 12 and 13 of the wedge such inequality can be relieved and any tendency toward localized points of excessive pressure will be minimized. By reason of the fact that the edges 12 and 13 of the wedge are longitudinally straight, it is an easy matter to machine the grooves 14 and 15 therein.

When a wire cable is to be looped into the housing, its stiffness will cause the loop, as tension is gradually applied to the cable, to bulge outwardly as shown in Figure 1. If the upper portions of the walls 7 and 8 of the socket were straight and ended abruptly in sharp edges, the cable would be subjected to a scraping or abrading action by the sharp edges of the housing, which would be quite detrimental to the strength of the cable.

In order to permit the loop of cable to be initially drawn into the socket without abrasion, I form the cable-engaging sides of the socket above the cable-clamping portions thereof with sharply outwardly flared portions 16 and 17. The cable loop in being drawn down into the socket will ride on these outwardly flared portions instead of being scraped by sharp edges which might otherwise be present. I prefer to form the top edges of the portions 16 and 17 as rounded, thus eliminating all sharp edges in the vicinity of the cable.

The walls 7 and 8 of the socket are preferably parallel respectively to the edges 12 and 13 of the wedge throughout at least a portion of their lengths. Near the smaller end of the housing, however, the walls 7 and 8 are gently flared outwardly as shown at 18 and 19. It will be seen that by this provision the edges of the wedge and the walls of the socket diverge toward the smaller end of the socket. A gradually increasing clamping grip is imparted to the cable thereby, the grip being least at the tensioned end of the cable loop and becoming gradually greater toward the untensioned portion thereof. The flared portions 18 and 19 may extend any desired distance longitudinally of the housing so that the gradually increasing clamping grip on the cable may be distributed over as much of the length thereof as may be practicable.

Referring now to Figure 5, a clamp is shown which comprises a housing 2' and a wedge 3'. In order to exert a gradually increasing clamping grip upon the tensioned leg of the cable loop over as great a length thereof as possible, the edges 12' and 13' of the wedge are straight throughout their lengths and the angle of taper therebetween is slightly greater than the angle of taper between the walls 7' and 8' of the socket. By this provision a gradually and uniformly increasing clamping grip is insured on the tensioned leg of the cable loop, and at the same time the edges of the wedge 3' are formed straight to simplify the machining of the longitudinal grooves therein.

While I have shown and described the longitudinal grooves as being formed in both of the cable-engaging edges of the wedge, it is to be understood that the effect produced thereby in allowing a slight spreading movement of the sides of the edge of the wedge is particularly desirable on the side next the tensioned leg of the cable loop. On the opposite side of the wedge the cable is under relatively small tension and the effect produced by the use of the groove 15 is of minor importance. For this reason the groove 15 in the edge of the wedge next the untensioned leg of the loop may be entirely omitted if desired. An additional advantage in providing both wedge edges with grooves, however, resides in the fact that the wedge thus formed is symmetrical and may be inserted into the housing with either edge next the tensioned leg of the loop.

While I have specifically illustrated and described the preferred embodiment of my invention, it is to be understood that the invention is not limited to its illustrated embodiment but may be otherwise embodied within the scope of the following claims.

I claim:

1. A clamp for cables or wires, comprising a housing having a tapered socket for receiving a loop of the cable or wire, and a wedge in the socket and within the loop for frictionally clamping the cable or wire against the socket, the edge of the wedge engaging the tensioned leg of the loop being straight substantially in the direction of its length, the socket being so formed that when the wedge is in cable-clamping position therein said straight edge of the wedge and the cable-engaging portion of the socket cooperating therewith diverge toward the smaller end of the socket, whereby to impart to the cable or wire a gradually increasing clamping grip.

2. A clamp for cables or wires, comprising a housing having a tapered socket for receiving a loop of the cable or wire, and a wedge in the socket and within the loop for frictionally clamping the cable or wire against the socket, the edge of the wedge engaging the tensioned leg of the loop being straight substantially in the direction of its length, the cable-engaging surface of the socket cooperating with said straight edge of the wedge being curved outwardly at the smaller end of the socket, whereby to impart to the cable or wire a gradually increasing clamping grip.

3. A clamp for cables or wires, comprising a housing having a tapered socket for receiving a loop of the cable or wire, and a wedge in the socket and within the loop for frictionally clamping the cable or wire against the socket, the edges of the wedge and the cable-engaging surfaces of the socket being straight substantially in the respective directions of their lengths and so formed that when the wedge is in cable-clamping position in the socket each of the edges of the wedge and the corresponding cable-engaging surface of the socket diverge toward the smaller end of the socket, whereby to impart to the cable or wire a gradually increasing clamping grip.

4. A clamp for cables or wires, comprising a housing having a tapered socket for receiving a loop of the cable or wire, and a wedge in the socket and within the loop for frictionally clamping the cable or wire against the socket, the cable-engaging sides of the socket above the cable-clamping portions thereof being flared sharply outwardly to permit the loop of cable to be initially drawn into the socket without abrasion.

5. A clamp for cables or wires, comprising a housing having a tapered socket for receiving a loop of the cable or wire, and a wedge in the socket and within the loop for frictionally clamping the cable or wire against the socket, the cable-engaging sides of the socket above the cable-clamping portions thereof being flared sharply outwardly and being rounded at their extremities to permit the loop of cable to be initially drawn into the socket without abrasion.

6. A clamp for cables or wires, comprising a housing having a tapered socket for receiving a loop of the cable or wire, and a wedge in the socket and within the loop for frictionally clamping the cable or wire against the socket, the cable-engaging edges of the wedge being straight substantially in the respective directions of their lengths, the cable-engaging sides of the socket above the cable-clamping portions thereof being flared sharply outwardly to permit the loop of cable to be initially drawn into the socket without abrasion.

In testimony whereof I have hereunto set my hand.

JEHU FREDERIC HAWORTH.